Feb. 8, 1966     R. H. DUNHAM     3,233,887
VACUUM CHUCK
Filed Jan. 28, 1963     2 Sheets-Sheet 1
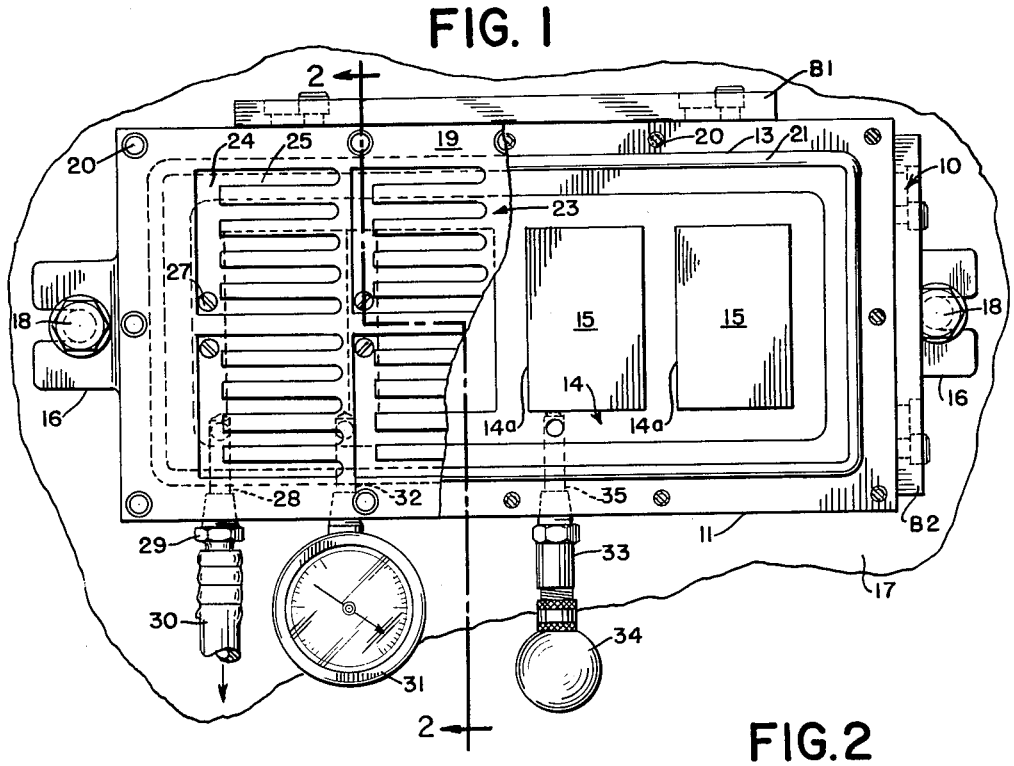
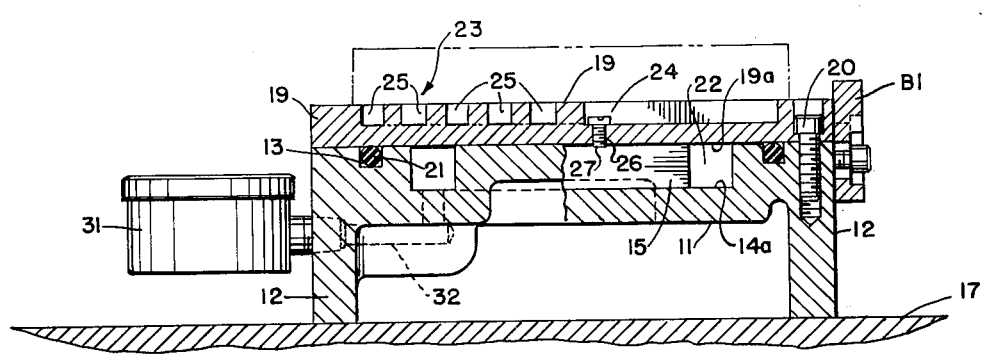
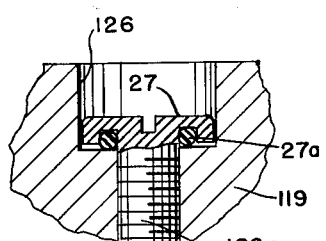
INVENTOR.
RUSSELL H. DUNHAM
BY *Mandeville and Schweitzer*
ATTORNEYS Feb. 8, 1966 R. H. DUNHAM 3,233,887
VACUUM CHUCK
Filed Jan. 28, 1963 2 Sheets-Sheet 2
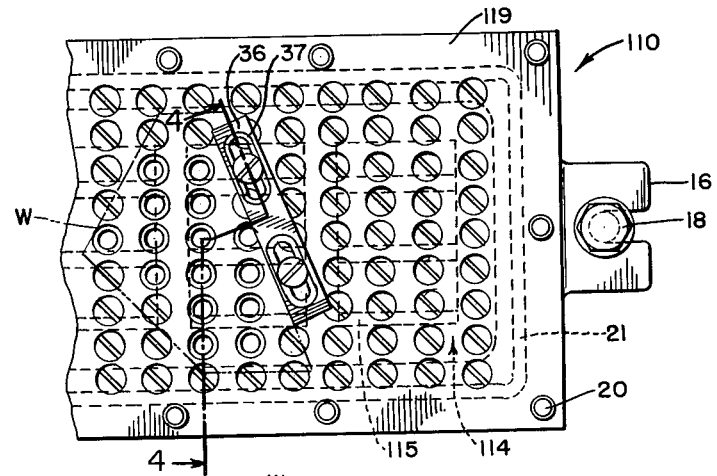
FIG. 3
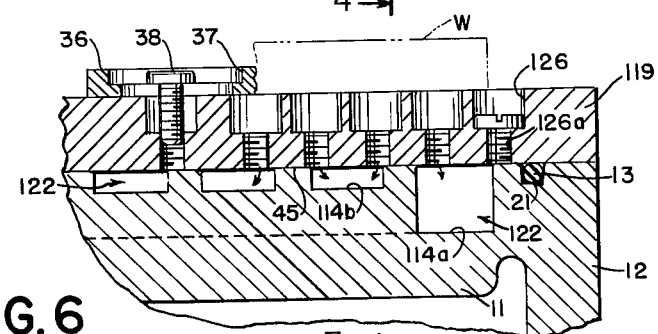
FIG. 4
FIG. 6
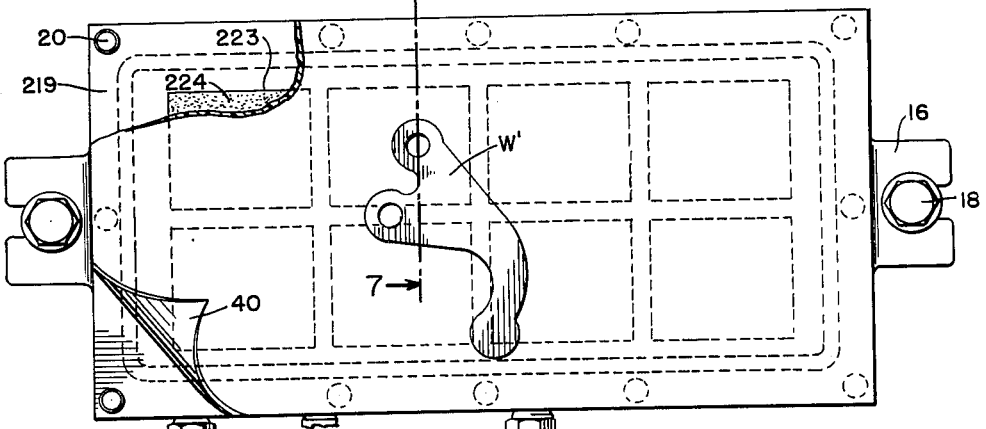
FIG. 7
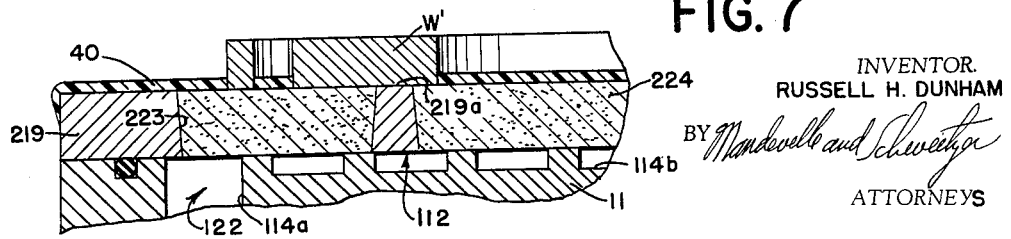
INVENTOR.
RUSSELL H. DUNHAM
BY Mandeville and Schweitzer
ATTORNEYS

United States Patent Office 3,233,887
Patented Feb. 8, 1966

3,233,887
VACUUM CHUCK
Russell H. Dunham, New Fairfield, Conn., assignor to The Dunham Tool Company, Inc., New Fairfield, Conn., a corporation of Connecticut
Filed Jan. 28, 1963, Ser. No. 254,085
5 Claims. (Cl. 269—21)

The present invention relates to workpiece holding devices and more particularly to a new and improved vacuum-actuated chuck of universally usable construction.

Heretofore, it has been conventional in the art to hold flat ferrous workpieces in magnetic chucks for layout, milling, flycutting, planing, surface grinding and like operations. However, the holding of similarly shaped, non-ferrous wokpieces for the same operations has been extremely difficult and in many cases impossible using conventional fixtures and holding mechanisms. Accordingly, it has been proposed to utilize vacuum-actuated chucks for holding non-ferrous, and even many ferrous, workpieces. However, vacuum-actuated chucks have not, heretofore, achieved widespread acceptance, because of the generally limited applicability and usefulness of vacuum chucks of known design and the resulting high cost and inconvenience of providing vacuum chucking facilities for a wide range of workpieces.

The new and improved vacuum chuck of the present invention enables a wide range of parts, made from such non-ferrous materials as carbon, aluminum, glass and plastic, to be securely held during flycutting, milling, surface grinding and planing operations on a single basic chuck unit, utilizing interchangeable surface plates for the accommodation of various types of workpieces. Specifically, the vacuum chuck of the present invention comprises a universal housing having predetermined vacuum channels, a chucking or surface plate which cooperates with the channels to form a vacuum chamber, an O-ring seal between the housing and plate and predetermined chucking ports in the surface plate which allow the generated vacuum in the vacuum chamber to hold a workpiece to the surface of the plate. The housing also includes an exhaust line for withdrawing air from the vacuum chamber to create the necessary vacuum, a pressure gage to measure and indicate that vacuum and a release valve to admit air into the vacuum chamber to destroy the vacuum and release the held workpiece from the chucking plate.

A particularly important aspect of the present invention is the provision of a vacuum chuck of universal applicability, having a common base usable with any of a large plurality of surface plates. Rapid interchangeability of a series of specially designed chucking plates, made in accordance with the present invention, enables an almost endless variety of workpieces to be chucked. Such interchangeability is accommodated by providing a surrounding O-ring sealing element in the universal base element, circumscribing the vacuum chamber in the base and enabling a surface plate to be readily clamped in the sealed relation to the vacuum chamber.

In accordance with one aspect of the invention, a plurality of discrete chucking ports may be tapped and selectively plugged to define the general outline of a part to be held, or the ports may be formed of a porous surface material, advantageously a porous stainless steel material, which porous material is in turn is masked to define the general outline of a part to be held. Alternatively, the chucking ports may be in the form of a series of grids which may be sealed off from the vacuum chamber to limit the vacuum holding area generally to the dimensions of the part to be chucked.

For greater and more complete understanding of the nature of the present invention, reference should be made to the following detailed description taken in conjunction with the accompanying drawings, in which:

FIG. 1 is a plan view of a vacuum chuck, including a grid-type chucking plate, embodying the principles of the present invention;

FIG. 2 is a cross-sectional view of the mechanism of FIG. 1 taken along line 2—2 thereof;

FIG. 3 is a partial plan view of the vacuum chuck of the invention including a novel, multi-port chucking plate embodying principles of the invention;

FIG. 4 is a cross-sectional view of the chuck assembly of FIG. 3 taken along line 4—4 thereof;

FIG. 5 is an enlarged cross-sectional view of an advantageous form of dry seal plug used with the chucking plate of FIGS. 3 and 4;

FIG. 6 is a plan view of the vacuum chuck of the invention, including a novel chucking plate having its operative surface formed principally by material, such as stainless steel, embodying principles of the present invention; and FIG. 7 is a cross-sectional view of the chuck assembly of FIG. 6 taken along line 7—7 thereof.

With reference to FIGS. 1 and 2 of the drawings, reference numeral 10 generally designates a vacuum chuck housing or base, advantageously of cast construction, which includes an upper wall 11 supported by integral housing walls 12. An endless, upwardly opening sealing groove 13 is formed in the machined upper surface of the upper wall 11, advantageously spaced inward slightly from the edge extremities of the base. Within the outline of the circumscribing sealing groove 13, the upper wall 11 has formed therein a network 14 of interconnected vacuum canals 14a, which themselves define a series of support "islands" 15 forming part of the machined upper surface of the base 10. Advantageously, a pair of mounting lugs 16 extend from the housing 10 to allow the vacuum chuck housing to be securely bolted to a surface 17, such as, for example, the table of a milling machine or surface grinder, by a pair of mounting bolts 18.

A rectangular chucking plate 19 is secured to the upper wall 11 of the vacuum chuck housing 10 and against the surface islands 15 by a series of bolts 20 disposed about the periphery of the plate, advantageously outside of the sealing groove 13. In accordance with a significant aspect of the invention, the closure between a machined bottom surface of the chucking plate 19 and the machined upper surface of the housing 10 is made vacuum tight by an O-ring 21 positioned in the sealing groove 13 and having an initial condition in which the top of the O-ring projects well above the surface of the base. The O-ring 21 is compressed into tight-sealing relation with the base and chucking plate when the bolts 20 are tightened down. The vacuum canals 14 and the underside 19a of the chucking plate 19 cooperate to form a vacuum chamber 22 of predetermined configuration, advantageously including an enclosing outer passage and a plurality of transverse connecting passages.

A series of independent grid segments 23, each of which includes a vacuum supply channel 24 and a plurality of holding channels 25 joined perpendicularly thereto, is formed in the top surface of the chucking plate 19 by appropriate machining operations. Each grid segment 23 is separately connected to the vacuum chamber by means of a tapped vacuum port 26, which has associated therewith a dry seal plug 27 to isolate the grid 23 from the vacuum chamber 22. Removal of the dry seal plug 27 will, of course, expose the grid 23 to the pressure of the vacuum chamber 22.

An exhaust passage 28 communicates between the vacuum canal network 14 and an external fitting 29 which is adapted to be connected to a vacuum pump (not shown) by appropriate means, such as a tube 30. A pressure (vacuum) gage 31 is mounted in a housing wall 12 and communicates through the reference passage 32 with the vacuum canal network 14. An adjustable release valve 33 having a control handle 34 is also mounted in a housing wall 12 and communicates with the vacuum canal network 14 through a release passage 35. Advantageously, the reference passage, exhaust passage and release passage are parallel and terminate in the same general area of the housing 10 to facilitate both the manufacture and subsequent operation of the new vacuum chuck mechanism.

In the operation of the chuck mechanism shown in FIG. 1, the workpiece is placed on the machined top surface of the chucking plate in the position in which it is to be held. Those grid segments 23, which do not lie directly beneath the workpiece to be held, are sealed off from the vacuum chamber 22 by means of the dry seal plugs 27, while those grid segments, which are covered by the workpiece, are exposed to the vacuum chamber by removal of the dry seal plugs associated therewith.

The workpiece is chucked securely in place by evacuating the vacuum chamber 22 by means of a vacuum pump which reduces the absolute pressure in the chamber to a pressure below atmospheric, for example 22″ Hg, at which pressure the workpiece will be firmly drawn to the surface of the chucking plate. Typically, a small, one-third horse power vacuum pump will develop a holding power of approximately 12 pounds per square inch.

The great holding power of the chucking plate and a small pump is achieved by maintaining the vacuum chamber airtight and by introducing the reduced pressure of the vacuum chamber to the surface of the grid segments 23 only in the areas beneath the part to be held. The O-ring 13 and the dry seal plugs 27, each of which includes a miniature O-ring, insure a very efficient airtight closure of the vacuum chamber. A measurement of the specific vacuum developed in the chamber may be obtained from the pressure gage 31 which communicates with the chamber 22. For handling of delicate parts, the vacuum level may be reduced by adjusting the release valve 33 for a predetermined, controlled leakage of air into the exterior of the base 10.

After the desired machining is performed on the workpiece, it may be quickly and simply released from the surface of the chucking plate 14 by destroying the vacuum in the chamber 22. This is accomplished by slowly admitting air, at atmospheric pressure from without the vacuum chamber, into the chamber by opening the release valve 33. When the pressure in the vacuum chamber 21 is substantially equal to the atmospheric pressure, the workpiece may be removed from the vacuum chuck. To repeat the procedure for another workpiece of the same size, the release valve is closed and the part is placed over the "active" grid segments, the segments which are exposed to the pressure of the vacuum chamber through the vacuum ports 26.

To aid in positioning of parts for repetitive operations, and to provide positive mechanical stops against lateral movement of the workpiece under heavy transverse working forces, retractable stop bars $B_1$, $B_2$, are provided along one end and one side of the base 10. The bars may be adjustably positioned at various predetermined levels above the surface of the chucking plate.

It should be understood that a great variety of shapes and sizes of workpieces may be chucked on the chucking plate 14 by simply varying the pattern of the grid segments exposed to the vacuum. While this does, in fact, give a fairly substantial universality of application for relatively medium sized workpieces, it is not especially suited for holding smaller or unusually shaped workpieces which do not entirely cover the area of at least one of the relatively large grid segments 23. For the smaller workpieces, it may be advantageous to utilize an alternate, preferred embodiment shown in FIG. 3, where, in a chuck plate 119, in lieu of the relatively large grid segments 23, there are a multiplicity of single vacuum holding ports 126, each of which is designed to communicate with a vacuum chamber 122 by means of a tapped neck portion 126a.

In the alternate, preferred embodiment of the mechanism of the present invention shown in FIGS. 3 and 4, the housing or base 110 is essentially the same as the housing 10 of FIG. 1 with the sole exception that the vacuum canals 114a are supplemented by additional, auxiliary canals 114b to form a vacuum canal network 114 of increased working area as compared to the network in FIG. 1. Specifically, the deep main vacuum canals 114a communicate with a series of shallow supplementary or branch canals 114b to form a network 114 which defines a series of chucking plate support islands 115. For brevity and convenience, the remaining elements in the housing 110, all of which duplicate the elements in the housing 10 of FIGS. 1 and 2, have been identified with the reference numerals used in FIGS. 1 and 2. The significance and importance of the design of the network 114 is that it communicates with every vacuum holding port 126. The large number of individually controllable and closely spaced (e.g., spaced on one-half inch centers) vacuum holding ports 126 of the vacuum plate enable very small and odd-shaped parts to be vacuum chucked.

To provide desired alignment and to prevent possible sliding of small workpieces, a stop bar 36, having longitudinally extending recessed slots 37, may be utilized with the plate 114. The stop bar 36 may be set in any desired position by registering the slots 37 with a selected pair of the vacuum ports 126 and securing the stop bar to the plate 114 by means of holding screws 38 threaded into the tapped neck portions 126a.

The operation of the vacuum chuck mechanism of FIG. 3 is very similar to that of FIG. 1. A workpiece W, to be held, is initially placed on the vacuum plate surface and banked against the stop bar 36. Each of the vacuum ports which is not completely covered by the workpiece W is plugged by a dry seal plug 27, a cross-sectional view showing the nature of the seal made by the dry seal plugs 27 and the vacuum holding ports 126 being shown in FIG. 5. The O-ring element 27a of each plug, partly recessed in a downwardly facing groove in the head of the plug, is squeezed between the surface of the plug and the vacuum port 126 to insure air-tight closure in each of the ports to be closed off from the vacuum chamber, which closure is important in view of the particularly large number of openings to be sealed.

The workpiece W is then held securely in place for the performance of the necessary machining operations thereupon by placing it over the unplugged vacuum holding ports 126 and evacuating the vacuum chamber 122 in a manner similar to that described with reference to the embodiment of FIG. 1. Release of the workpiece from the chucking plate is effected as described hereinabove by destroying the vacuum by admission of air into the chamber through the release valve 33.

Another preferred embodiment of the present invention is shown in FIG. 6 wherein the vacuum chuck housing or base illustrated is identical to that shown in FIG. 4. Accordingly, the corresponding elements will be given the same reference numbers. The vacuum chucking plate 219 of this embodiment, however, is of a different design than that shown in either FIGS. 1 or 3. The plate 219 defines a series of rectangular grid ports 223, each of which is filled with a porous material, such as, porous stainless steel grid elements 224. The surface of the vacuum holding plate 219 is continuous, that is to say, there are no recessed vacuum ports or vacuum holding ports in it, as in the chucking plates 19 and 119.

However, there is actual porosity in the porous stainless steel grid elements 224, which porosity functions in a manner similar to that of the vacuum ports 26 of FIG. 1 and the vacuum holding ports 126 of FIG. 3. That is to say, when a vacuum is created in the vacuum chamber 122, the pressure in the chamber is exposed to the top surface 214a of the vacuum chucking plate 214 by means of the porous stainless steel grid elements 224. This particular form of the invention, which is extremely advantageous in that the grid surface 214a is flat and continuous, is described in greater detail in copending application Serial No. 284,615 filed May 31, 1963.

A flat workpiece of any shape whatever may be securely vacuum chucked by the plate 219 illustrated in FIG. 6. For example, to chuck a sinuous part W', it is placed on the plate surface 219a over a portion of at least one porous grid segment 224. A pealable, non-porous, plastic masking material is sprayed, or otherwise applied, over the entire grid surface and the part W' to form a mask 40 which seals all of the exposed porous grid elements from the atmosphere, leaving exposed areas only of the grid surface 214a immediately beneath the workpiece W', as is clearly shown in FIG. 7. When the vacuum pump evacuates the vacuum chamber 122, the reduced pressure in the chamber acts upon the underside of the part W', through the grid blocks 224, and serves thus to chuck the part to the top surface 214a of the vacuum plate. The mask 40 may be made from a neoprene pad for repeated use with identically shaped parts. Advantageously, parts having rough, unmachined surfaces may easily be held by the vacuum plate 214 and the plastic mask 40, when care is taken to insure that the mask is kept intact and that the only grid surface area exposed is in the unmasked area defining the profile of the workpiece. Holding and release of a workpiece in this embodiment is effected in the same manner as that of the other two preferred embodiments.

Thus, it may be seen that the novel vacuum chuck illustrated hereinabove provides a new and simple means of efficiently holding flat, non-ferrous workpieces of all sizes and shapes for milling, flycutting, surface grinding, planing and like operations. Flat parts that heretofore required complex jigs and fixtures may now be readily chucked efficiently and with minimum effort and expense by means of the variety of chucking plates and the common base of the present invention, the combinations of which provide the necessary universality to meet the unique and rigorous demands of present-day chucking applications.

Utilization of a common base, one which is readily usable with a multiplicity of interchangeable and replaceable surface plates, has enabled substantial economies in production and manufacturing to be realized. Moreover, the specific, disclosed embodiments of the present invention, while being relatively simple to use, provide high chucking efficiency, extreme reliability and great universality of application.

Although the present invention has been described with reference to a specific, preferred embodiment, it should be understood that the disclosure has been made only by way of example and that certain changes in details of construction and arrangement of the elements may be made without departing from the spirit and scope of the invention as hereinafter claimed.

I claim:
1. A work-holding device for relatively flat objects and the like, comprising:
 (a) a one-piece universal vacuum chuck housing adapted to be anchored to a flat surface;
 (b) said housing having an upper portion of predetermined outline;
 (c) said upper portion defining an endless recessed sealing groove at its outermost surface within said predetermined outline;
 (d) said upper portion defining an endless vacuum channel at the outermost surface of said upper portion within the outline of said sealing groove;
 (e) an interchangeable chuck plate being securely fastened to said outermost surface of said housing and having top and bottom surfaces;
 (f) said bottom surface of said plate cooperating with said vacuum channel to form a vacuum chamber;
 (g) an O-ring being located within said groove and projecting into sealing contact with said bottom surface of said chuck plate to seal in an air-tight manner said vacuum chamber from the external atmosphere;
 (h) said chuck plate defining at least one chuck port;
 (i) said chuck port communicating between said vacuum chamber and said top surface of said chuck plate;
 (j) a passage communicating with said vacuum chamber and adapted to be connected to a vacuum pump to withdraw air from said chamber to create a vacuum therein;
 (k) a selectively adjustable release valve means connected to said vacuum chamber and adapted to controllably vary the absolute pressure therein; and
 (l) whereby the covering of said port by a workpiece or the like seals the vacuum chamber from the external atmosphere and the subsequent reduction of absolute pressure in the chamber through the withdrawal of air therefrom causes said workpiece or the like to be securely and immovably forced against and held to said chuck plate until said vacuum is destroyed by the admission of air into said chamber by said release valve means.

2. A work-holding device for relatively flat objects and the like, comprising
 (a) a one-piece vacuum chuck housing adapted to be anchored to a flat surface;
 (b) said housing having an upper portion of predetermined outline;
 (c) said upper portion defining an endless sealing groove at its outermost surface within said predetermined outline;
 (d) said upper portion defining and endless vacuum channel at the outermost surface of said upper portion within the outline of said sealing groove;
 (e) a chuck plate being securely fastened to said outermost surface of said housing and having top and bottom surfaces;
 (f) said botton surface cooperating with said vacuum channel to form a vacuum chamber;
 (g) said chuck plate defining a plurality of unsealed chuck ports disposed in a predetermined pattern;
 (h) said shuck ports communicating between said vacuum chamber and said top surface of said chuck plate;
 (i) a plurality of dry seal plugs cooperating with selected ones of said chuck ports to define a predetermined pattern of sealed chuck ports generally outlining the workpiece to be held;
 (j) a passage communicating with said vacuum chamber and adapted to be connected to a vacuum pump to withdraw air from said chamber to create a vacuum therein; and
 (k) a release valve means associated with said vacuum chamber and adapted to effect the absolute pressure therein;
 (l) whereby the covering of the unsealed chuck ports by a workpiece or the like seals the vacuum chamber from the external atmosphere and the subsequent reduction of absolute pressure in the chamber through the withdrawal of air therefrom causes said workpiece or the like to be securely and immovably forced against and held to said chuck plate until said vacuum is destroyed by the admission of air into said chamber by said release valve means.

3. A work-holding device in accordance with claim 2, which includes (a) a stop bar;
(b) fastening means holding said stop bar on said plate in predetermined relation with the unsealed chuck ports; and
(c) said stop bar being adapted to cooperate with a workpiece to align said workpiece in a predetermined relation with said unsealed chuck ports.

4. A work-holding device according to claim 3, in which
(a) said fastening means comprise threaded screws;
(b) all of said chuck ports are provided with thread means; and
(c) said screws cooperate with certain of said thread means to maintain said stop bar in said predetermined relation.

5. A work-holding device for relatively flat objects and the like, comprising
(a) a one-piece vacuum chuck housing adapted to be anchored to a flat surface;
(b) said housing having an upper portion of predetermined outline;
(c) said upper portion defining an endless sealing groove at its outermost surface within said predetermined outline;
(d) said upper portion defining an endless vacuum channel at the outermost surface of said upper portion within the outline of said sealing groove;
(e) a chuck plate being securely fastened to said outermost surface of said housing and having top and bottom surfaces;
(f) said bottom surface cooperating with said vacuum channel to form a vacuum chamber;
(g) said chuck plate defining at least one chuck port;
(h) said chuck port communicating between said vacuum chamber and said top surface of said chuck plate;
(i) a passage communicating with said vacuum chamber and adapted to be connected to a vacuum pump to withdraw air from said chamber to create a vacuum therein; and
(j) a release valve means associated with said vacuum chamber and adapted to affect the absolute pressure therein;
(k) whereby the covering of said port by a workpiece or the like seals the vacuum chamber from the external atmosphere and the subsequent reduction of absolute pressure in the chamber through the withdrawal of air therefrom causes said workpiece or the like to be securely and immovably forced against and held to said chuck plate until said vacuum is destroyed by the admission of air into said chamber by said release valve means.

References Cited by the Examiner
UNITED STATES PATENTS

| | | | |
|---|---|---|---|
| 750,667 | 1/1904 | Lewellyn et al. | 51—235 X |
| 2,133,518 | 10/1938 | Huebner | 51—235 |
| 2,694,337 | 11/1954 | Anander | 269—21 X |
| 2,855,653 | 10/1958 | Kastenbein | 269—21 X |

ROBERT C. RIORDON, *Primary Examiner.*

FRANK R. SUSKO, *Examiner.*